United States Patent [19]
Cleaveland et al.

[11] 3,783,209
[45] Jan. 1, 1974

[54] MECHANISM FOR HOLDING AND LEVERING LARGE DRAW OUT TYPE CIRCUIT BREAKERS

[75] Inventors: Charles M. Cleaveland, Irwin; Fred Bould, Pittsburgh, both of Pa.

[73] Assignee: Westinghouse Electric Corp., Pittsburgh, Pa.

[22] Filed: Oct. 31, 1972

[21] Appl. No.: 302,623

[52] U.S. Cl. ............................................. 200/50 AA
[51] Int. Cl. ............................................. H01h 33/50
[58] Field of Search .................... 200/50 A, 50 AA, 200/158; 317/103

[56] References Cited
UNITED STATES PATENTS

| | | | |
|---|---|---|---|
| 3,440,371 | 4/1969 | Netzel et al. | 200/50 AA |
| 3,710,044 | 1/1973 | Sharp | 200/50 AA |
| 3,219,771 | 11/1965 | Umphrey | 200/50 AA |
| 3,235,681 | 2/1966 | Pokorny et al. | 200/50 AA |
| 3,030,463 | 4/1962 | Kuzlovic et al. | 200/50 AA |
| 3,578,925 | 5/1971 | Drown et al. | 200/50 AA |

Primary Examiner—J. R. Scott
Attorney—A. T. Stratton et al.

[57] ABSTRACT

A levering and holding device is provided for positioning large circuit breakers in a switchgear compartment or cell. The levering and holding device comprises a box beam which can be secured to the cell walls and a rotatable threaded shaft which is connected to the beam. A threaded shaft has a nut threaded thereon and has one end fixed to the beam. The thread shaft may be rotated with a crank. The breaker is attached to the nut, and as the shaft is rotated, the nut is moved along the shaft and moves the breaker into position. Interlocks are provided to prevent the breaker from being levered into the cell when the beam is not engaged in the cell wall and to prevent the beam from being disengaged from the cell wall unless the breaker is in a fully disengaged position. Another interlock is provided so that when the breaker is closed and in the operating position the threaded shaft cannot be rotated to lever out the breaker.

8 Claims, 5 Drawing Figures

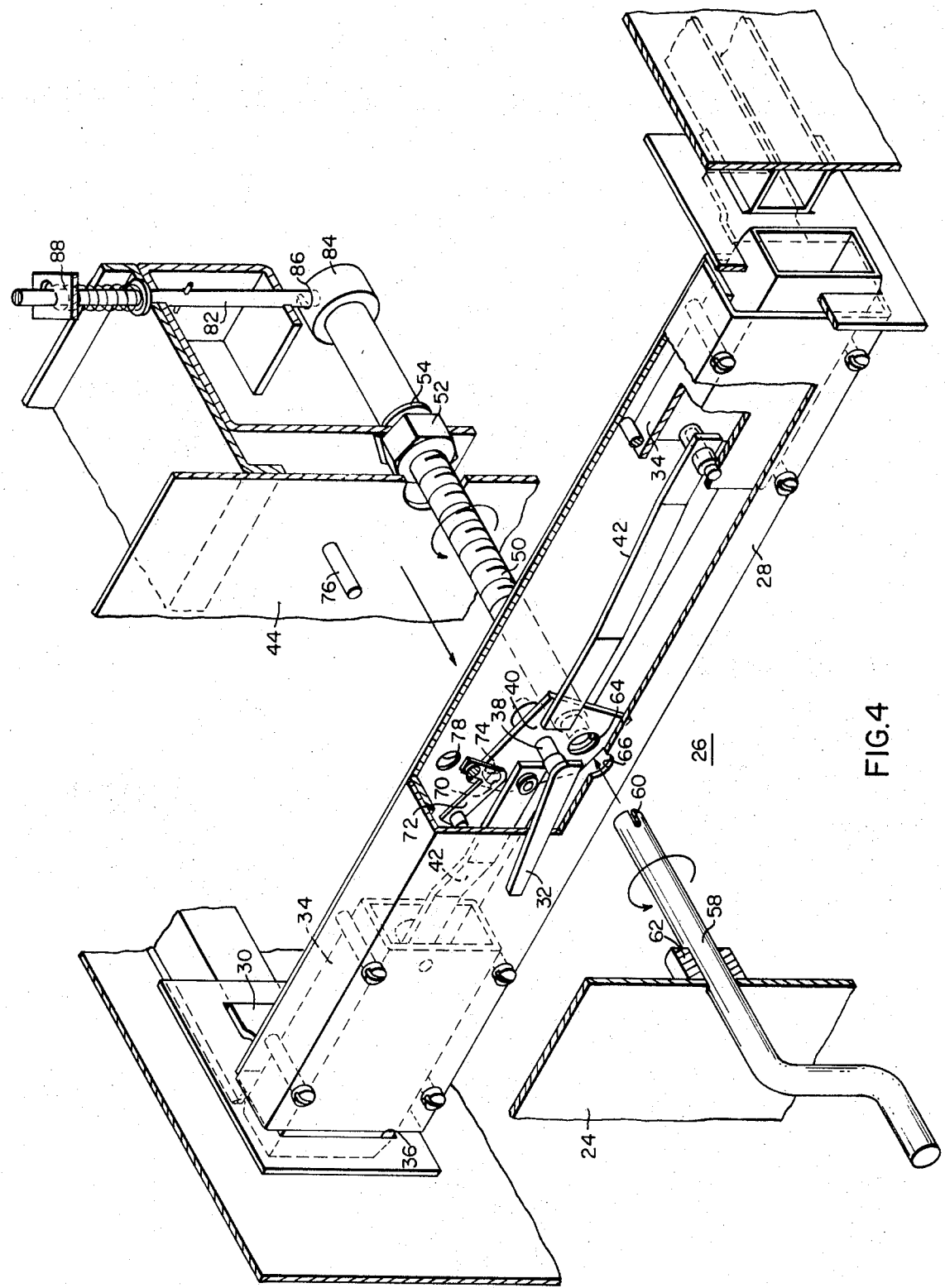

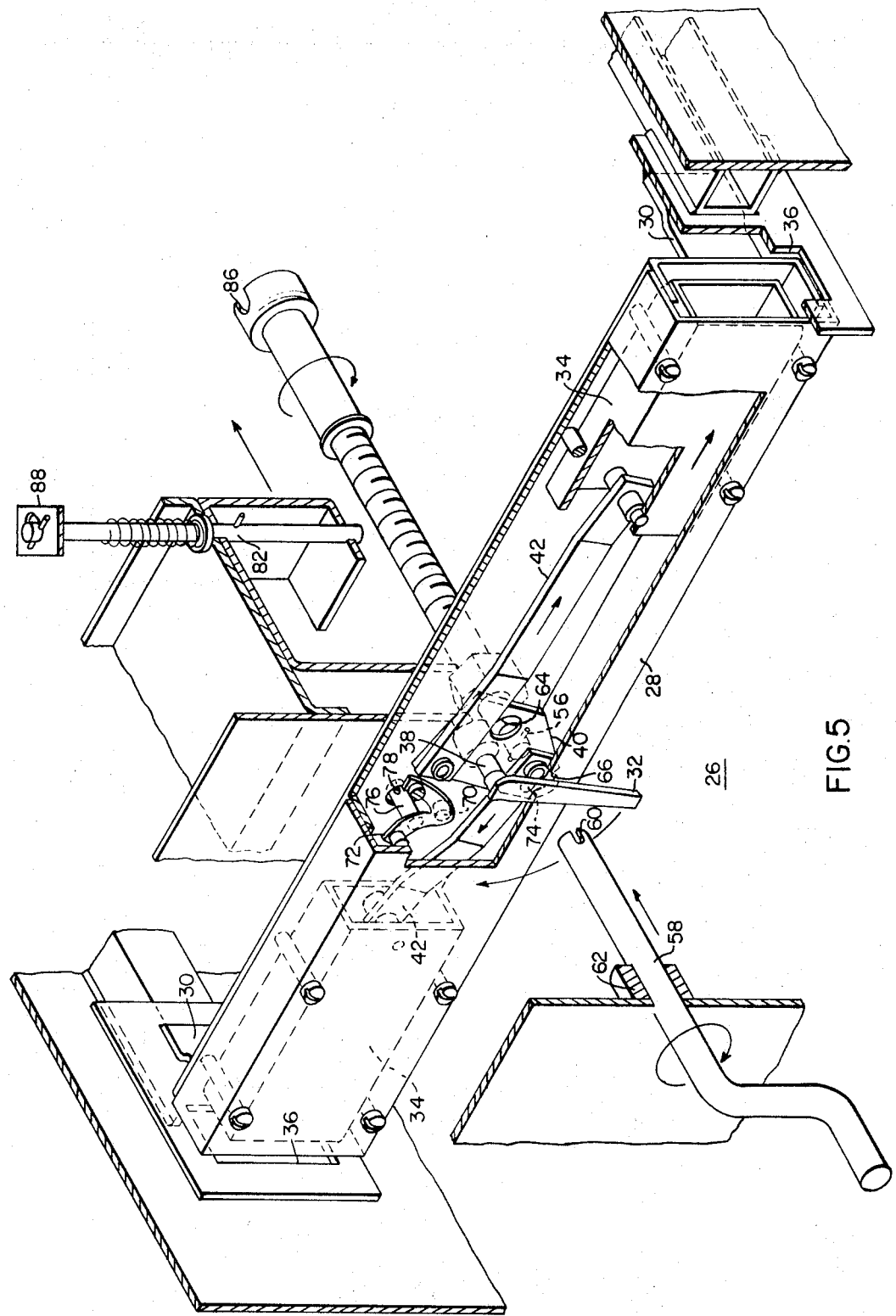

MECHANISM FOR HOLDING AND LEVERING LARGE DRAW OUT TYPE CIRCUIT BREAKERS

BACKGROUND OF THE INVENTION

This invention relates to circuit breakers and more particularly to large type drawout circuit breakers and a novel holding and levering mechanism for positioning the breakers in an enclosure.

Prior art circuit breakers utilize levering mechanisms for moving circuit breakers in a compartment between fully engaged and fully disengaged positions. In the metal clad switchgear a levering device is usually provided for mechanically moving the circuit breaker unit between the test or disconnected position and the operating or connected position, within the cell or compartment. Interlocking devices are normally provided which cooperate with the levering mechanism to trip open the circuit breaker if the circuit breaker unit is moved from the test to the connected position or visa versa with the breaker in the closed position. A difficulty which has been present in certain prior art levering mechanisms is that the threaded rod or lead screw, which must be engaged by a levering in crank, moved with respect to the cell. This lead screw movement made levering from outside the cell door difficult. When the lead screw moves with respect to the cell, electric motor operated levering and levering from the side of a switchgear unit or lineup is difficult to arrange. Another disadvantage of certain prior art drawout type circuit breakers is that they rely on indentations in the wheel rails to locate the test position. This is not a very positive type of positioning means.

In certain other types of switchgear, the levering device relies upon disengagable threaded parts for forcing the switchgear units into and out of the connected position. A problem which has been encountered in prior art mechanisms of this type is that the disengagable threaded parts can be easily damaged. To prevent this damage, special precaution in alignment between the nut and lead screw must be taken and the lead screw must have a special design to prevent peening of the threads as the breaker is moved into the cell.

Another disadvantage of some prior art levering in devices is that they are mounted on the rear of the cell behind the breaker or interrupter contacts. This can cause a dielectric problem as well as presenting a safety hazard when it is necessary to inspect the levering in device with the breaker energized.

SUMMARY OF THE INVENTION

The novel holding and levering in mechanism which is the subject of this invention is attached to the front of a drawout circuit breaker. A hollow box beam which can be secured to the cell structure is mounted on the front panel of the circuit breaker. As the drawout circuit breaker is pushed into the cell the ends of the box beam butt against a set of stops mounted on the walls of the cell structure. This locates the circuit breaker so that the box beam can be securely attached to the cell structure. At this point a handle on the beam can be manually rotated, causing locking bolts to engage the cell structure, mechanically securing the beam and holding it from further movement. With the locking members engaged the box beam becomes a structural part of the cell and is used to take the reaction force of levering the breaker into and out of the operating position. An interlock is attached to the beam handle so that the levering in crank cannot engage the lead screw until the box beam is secured to the cell structure.

With the beam secured to the cell wall, the crank can be inserted through the cell door to engage the lead screw. The lead screw is rotatably attached to the beam and a nut that moves on the lead screw is secured to the circuit breaker frame. With the beam secured to the cell structure and the breaker fully disconnected or retracted, the circuit breaker is in test position. As the lead screw is turned, with the levering in crank, the nut moves the breaker between the test position and the operating position in the switchgear cell. When the breaker is moved to the operating position the nut engages a stop on the lead screw and further clockwise rotation of the lead screw is not possible.

The end of the lead screw which does not engage the crank is forged into a cup-shaped and slotted. A mechanical interlock is provided to prevent the circuit breaker from being levered out of the operating position when the circuit breaker contacts are closed. If an attempt is made to lever out the circuit breaker from the operating position while the contacts are closed a spring loaded rod engages a slot in the forged end of the lead screw, preventing rotation of the lead screw. This immediately indicates that the circuit breaker is closed. This feature is provided to prevent the accidental shutdown of a circuit due to the wrong breaker being levered out of the operating position.

This invention has several advantages over prior art levering devices. For example, the breaker can be levered in from outside the cell door even with a front extension on the cell. Another advantage of the present invention is that the circuit breaker is rigidly held in the test position by the lead screw and box beam. The breaker can be shipped in the cell while in the test position. The box beam, locking members and associated structures are designed to hold the breaker against inertial forces during shipping as well as the magnetic forces present during high currents. Another advantage is that the levering in mechanism is in front of the circuit interrupter, this eliminates any dielectric problem as is possible if portions of the levering in device are mounted on the rear of the cell, causing various parts to pass close to the interrupters. The levering in device is in front of the panel barrier of the breaker and is fully accessible for examination, even while the breaker is energized and under load. This is a safety feature since it eliminates the danger of an operator trying to get behind the barrier if he feels there is difficulty with the levering device. Still another advantage of the present invention is that the nut and screw never disengage. There is no problem of damaging the threads of the lead screw as there is on devices where the net and screw engage and disengage at some point in the levering stroke.

BRIEF DESCRIPTION OF THE DRAWINGS

Further advantages of the present invention will be readily apparent upon reading the following description taken in conjunction with the drawings in which:

FIG. 4 is an enlarged isometric view partially in section of the holding and levering mechanism with the breaker moved to the operating position; and FIG. 5 is similar to FIG. 4 but with the breaker in disconnected position.

DESCRIPTION OF THE PREFERRED EMBODIMENT

Figure 1:
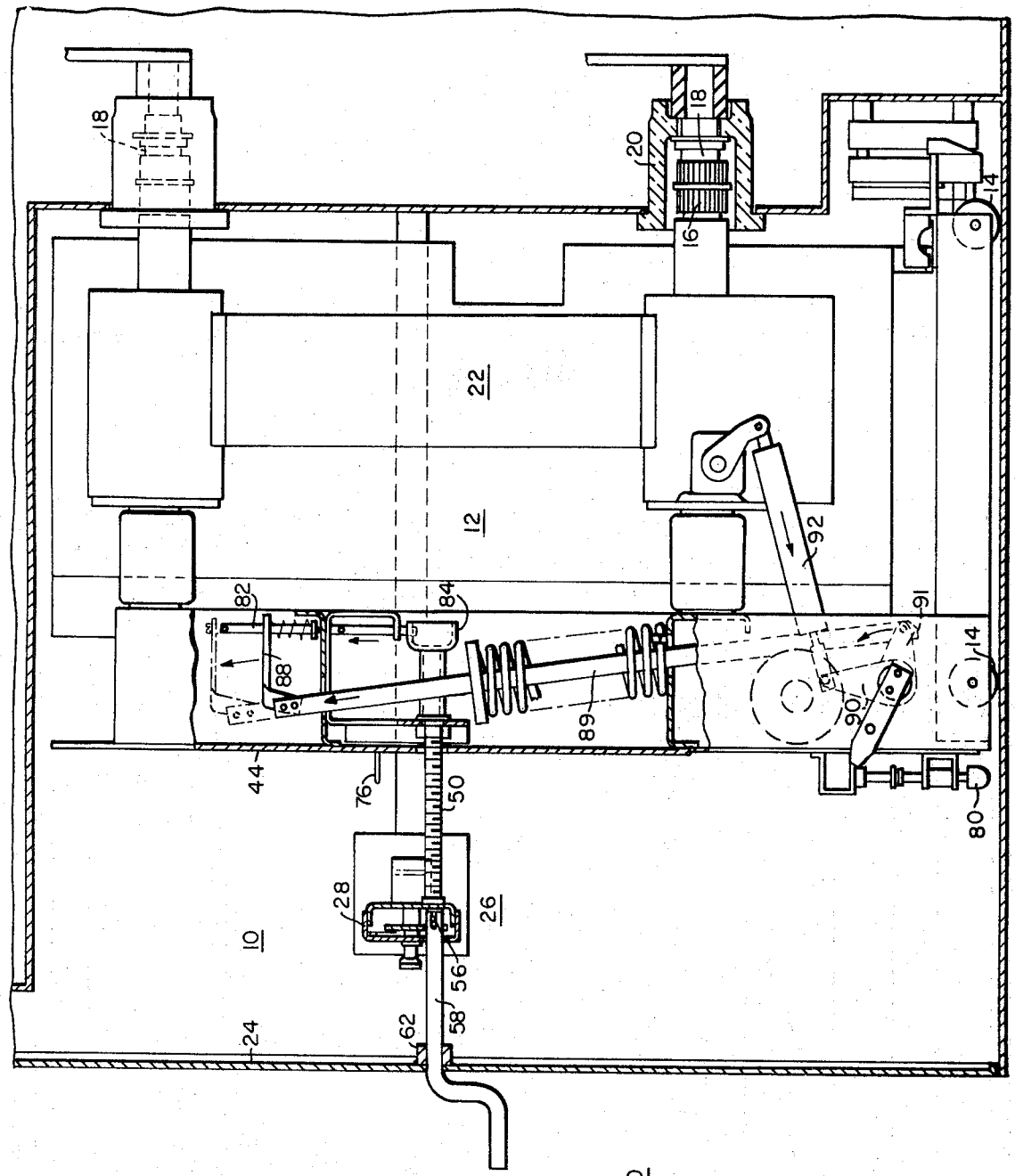
FIG. 1 is a view partly in side elevation and partly in section of a portion of a metal clad switchgear structure embodying the principal features of the invention showing a circuit breaker in the operating position.
Figure 2:
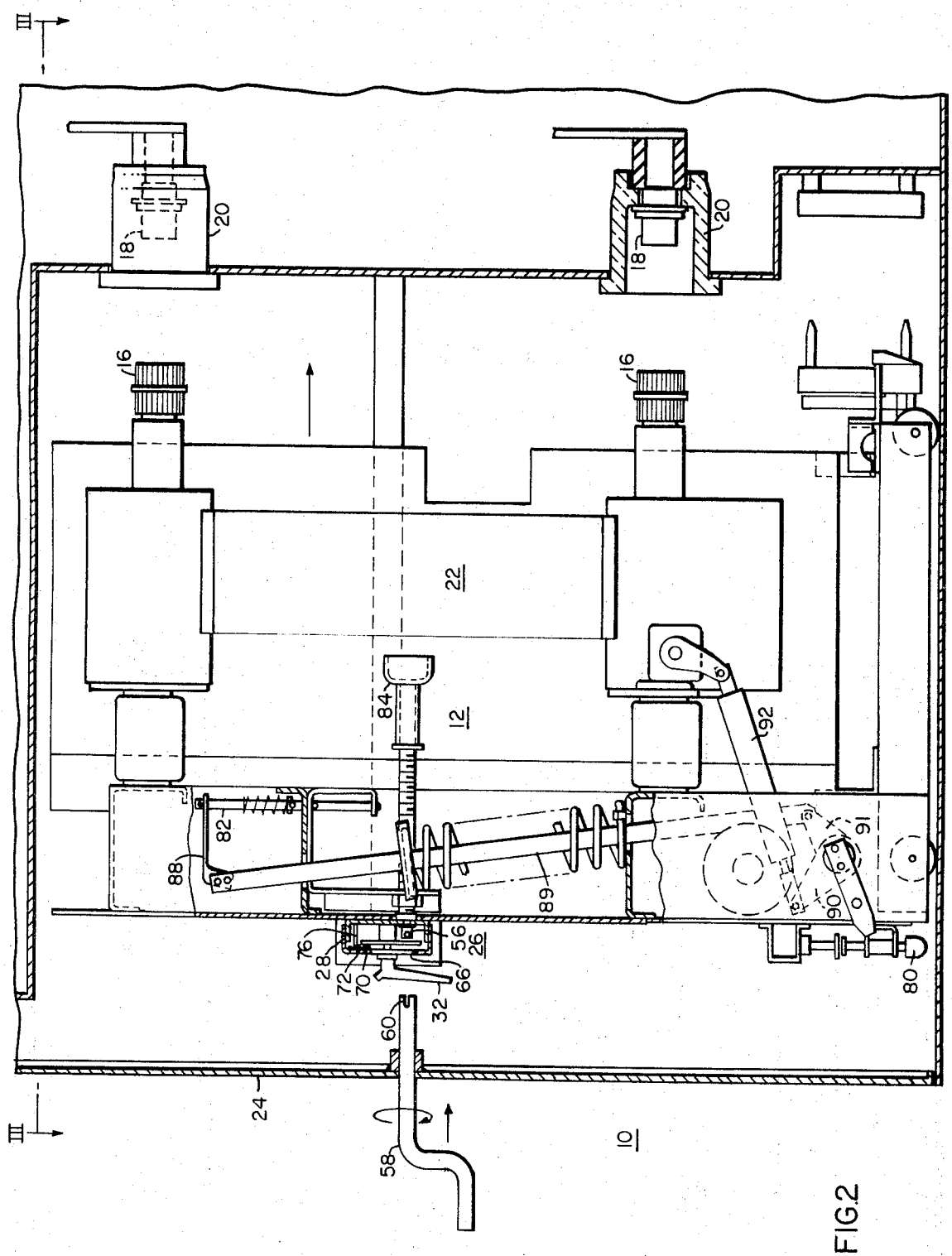
FIG. 2 is a view similar to FIG. 1 showing the breaker in a disconnected position.

Referring to the drawings and FIGS. 1 and 2 in particular, there is shown a portion of a metal cald switchgear cell or housing 10 which may be constructed by securing sheet metal members to a structural support frame in a manner well known in the art. A circuit breaker unit 12 is disposed in the cell and may be moved horizontally into and out of the cell on wheels 14. In accordance with the practice, the circuit breaker 12 is provided with plugtype disconnecting contacts 16 which are mounted to engage stationary contact studs 18. The stationary contacts 18 are mounted inside insulating sleeves 20. The insulating sleeves 20 are mounted internal to the switchgear cell 10. With the circuit breaker 12 in the operating position and closed, as shown in FIG. 1, a continuous current path exists from the upper stationary stud 18 through the interrupter 22 and out the lower stationary stud 18 for each phase. A door 24 is provided at the front of the cell 10 to permit the breaker 12 to be withdrawn from the cell 10.

A holding and levering mechanism 26, which is the subject of the present invention, is utilized for moving the breaker 12 between the operating and the test or disconnected position. As best shown in FIGS. 4 and 5 the holding and levering device 26 comprises a box beam 28, constructed from two C-shaped channel members. During operation, the circuit breaker 12 is pushed into the cell 10 until the box beam 28 butts against a set of stops 30. This locates the breaker 12 in the correct position for securing the beam 28 to the cell 10. When handle 32 is rotated clockwise this forces locking members 34 into engagement with openings 36 in the cell structure 10, and securely fastens the beam 28 to the cell 10. Handle 32 is rigidly attached to a shaft 38 which is rotatably supported in the box beam 28. Also rigidly attached to shaft 38 is a flat member 40. As handle 32 is rotated, flat member 40 also rotates, and through connecting links 42 which are pinned at one end to member 40 and at the other respective ends to the locking members 34, moving the locking members 34 into or out of engagement with the cell structure 10.

Figure 3:
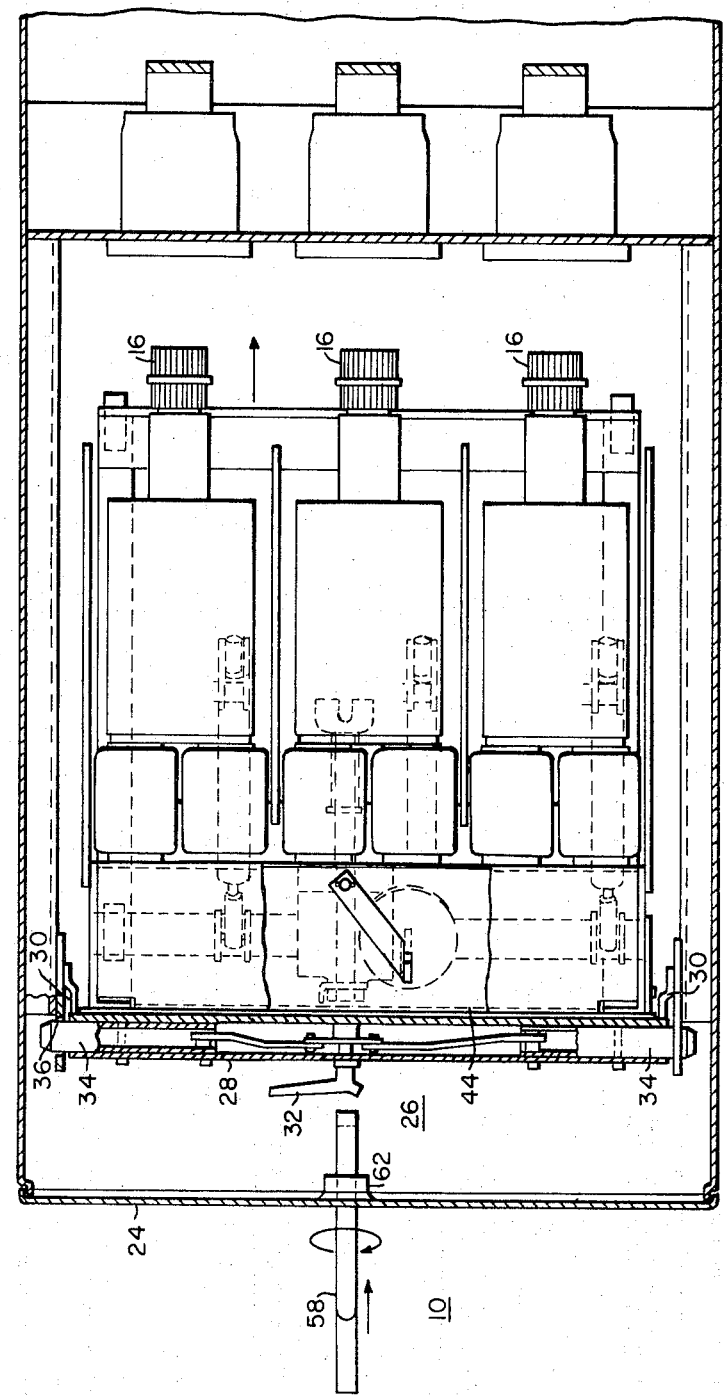
FIG. 3 is a top sectional view of a portion of the switchgear shown in FIG. 2 along the line III—III with the drawout circuit breaker in the test position.

With the locking members 34 engaging the cell 10 and the front panel 44 of the breaker 12 against the beam 28 as shown in FIG. 3, the breaker is now in the test position. The breaker 12 is fixed and held in the test position. This is an advantage over prior art breakers which locate the test position only by indentations in the wheel rails. From the breaker test position as shown in FIG. 3 the circuit breaker 12 can be levered into the operating position as shown in FIG. 1, by clockwise rotation of lead screw 50.

With the locking members 34 engaging the cell structure 10 the beam 28 becomes a structural part of the cell 10 and is used to take the reaction force of levering the breaker 12 into the operating position. Lead screw 50 is provided for levering the breaker into and out of the operating position. Box beam 28 contains lead screw 50 against movement along its longitudinal axis, while permitting rotational movement of lead screw 50. Lead screw 50 is journaled into beam 28 and a nut 52 that runs on the lead screw 50 is fixed to the breaker 12 frame. As the lead screw 50 is rotated in a clockwise direction the nut 52 moves the breaker 12 from the test position to the operating position in the cell 10. The breaker 12 location in the operating position is determined by the distance the nut 52 is allowed to travel on the lead screw 50. Levering into the operating position is complete when the lead screw 50 cannot be rotated further in the clockwise direction due to the nut 52 butting against a stop 34 on lead screw 50. The end of the lead screw 50, which is journaled into the beam 28, has a pin 56 through the end for engaging a crank 58, as can best be seen in FIG. 1. Slots 60 in the end of crank 58 fit around pin 56, through the end of lead screw 50, and engage lead screw 50 so that lead screw 50 rotates when crank 58 is rotated. Crank 58 can pass through an opening in door 24 to engage lead screw 50. A crank guide 62 is positioned at the opening on door 24 to guide the crank 58 into engagement with the lead screw 50.

An interlock is provided to prevent the breaker 12 from being levered into the operating position unless the locking members 34 are in engagement with the cell structure 10. The interlock consists of an opening 64 through flat member 40. When locking members 34 engage the cell structure 10 the hole 64 in the flat member 40 lines up with the hole 66 in the front of beam 28 through which the crank 58 must pass to engage the lead screw 50. When holes 64 and 66 are in line, crank 58 can engage lead screw 50 and the breaker 12 can be levered into the operating position. Flat member 40 and handle 32 are both rigidly attached to shaft 38 so that when handle 32 is rotated to disengage locking members 34, hole 64 is no longer aligned with hole 66 and the crank 58 cannot be inserted to engage the lead screw 50. When the crank 58 is in engagement with the lead screw 50, member 40 and handle 32 cannot be rotated to disengage the locking members 34.

To prevent the beam 28 from being unlocked from the cell 10 when the crank 58 is removed, another interlock is provided. This interlock consists of a pin 70 attached to a spring member 72 so that the pin 70 engages an opening 74 in flat member 40 when the circuit breaker 12 is levered out of the test position. The pin 70 engages the flat member 40 at all points in the levering stroke except the test position, where it is necessary to retract the locking members 34 to remove the breaker 12 from the cell 10. To disengage the pin 70 from the flat member 40 when the breaker is in the test position a stud 76 is attached to the front panel 44 of the circuit breaker 12. As the breaker 12 is levered towards the test position, stud 76 passes through an opening 78 in the back side of box beam 28 and deflects spring member 72. As the breaker 12 is levered fully into the test position, stud 78 deflects spring member 72 sufficiently so that pin 70 is disengaged from hole 74 in member 40. With crank 58 then removed, handle 32 can be rotated in a counterclockwise direction to disengage the locking members 34 from the cell 10. This allows the breaker 12 to be removed from the cell 10. FIGS. 2 and 5 best illustrate the stud 76 depressing the spring member 72 to disengage the pin 70 from the opening 74.

As is common in the prior art, to prevent a breaker 12 from being disconnected from the operating position while carrying current a floor tripper 80 actuates a tripping mechanism to trip open the breaker 12 at the beginning of the levering out stroke. A long wipe of the primary contacts 16 and 18 assures that the breaker 12 is open well before the contacts 16 and 18 disengage. In addition, the floor tripper keeps the breaker open at any position between the operating and the test position. The floor tripper 80 is actuated by a ramp (not shown) which is mounted on the floor of the breaker cell 10. In the present invention a mechanical interlock is provided to prevent the breaker 12 from being levered out of the operating position when the breaker is closed. When the breaker 12 is closed and in the operating position a spring loaded rod 82 prevents the lead screw 50 from being rotated so as to lever out the breaker 12. As can best be seen in FIGS. 1 and 4, the end of the lead screw 50, not attached to the beam 28, is forged into a cup shape. The cup-shaped end 84 of lead screw 50 has slots 86 which can be engaged by the spring loaded rod 82. When the breaker 12 is closed and in the operating position the lead screw 50 can be rotated for a portion of a revolution until the spring loaded rod 82 engages a slot 86. Further rotation of the lead screw 50 is thereby prevented and the breaker 12 cannot be levered out while in the closed position. Rod 82 is held in position by an extension 88 from the breaker operating mechanism. The breaker operating mechanism comprises parts 89, 90, 91 and 92. As can best be seen in FIG. 2, when the breaker is in the open position operating member 89 and extension 88 are raised and this lifts rod 82. Rod 82 is thus lifted above the cup-shaped portion 84 and cannot engage the slots 86. Thus, with the breaker 12 in the open position rod 82 is raised so that lead screw 50 can be rotated in a counterclockwise direction to lever out the circuit breaker 12. If the circuit breaker is closed and in the operating position the failure of the lead screw 50 to turn indicates that the breaker 12 is in the closed position. This feature is provided to prevent the accidental shutdown of a circuit due to the wrong breaker 12 being levered out of the operating position. This indicator and interlock is not meant to provide the function of the floor tripper 80.

The present invention has several advantages over certain prior art levering in devices such as the breaker 12 can be levered from outside the door 24 even with a front extension on the cell 10. The breaker 12 is rigidly held in the test position by the lead screw 50 and the beam 28, and since the breaker is rigidly held in the test position the breaker 12 can be shipped in the cell 10 in the test position. Another advantage is that since the lead screw is stationary with respect to the cell, electric levering and levering from the side of the switchgear lineup are much easier to arrange. Also since the lead screw has not moved away from the door it is easier to insert the crank 28 through a hole in the door 24 to engage the lead screw 50. Still another advantage of the present invention is that with the lead screw in front of the interrupter, there is no dielectric problem as is present with many prior art devices that have portions of the levering in mechanism mounted on the rear of the cell 10, and must have members passing close to the interrupters 22. Another advantage of the present invention is that the levering in device is in front of the panel barrier 44 of the breaker 12 and is fully accessible for examination even while the breaker 12 is energized and under load. This is a safety feature for it eliminates the danger of an operator trying to get behind the barrier if he feels there is difficulty with the levering device. Another advantage of the present invention is that the nut 52 and screw 50 never disengage. Thus, there is no problem of damaging the threads of the lead screw 50 as there is on devices where the nut and screw engage and disengage at some point in the levering operation. This device is also simpler and less expensive than prior art levering devices. Since the breaker is held in the center there is minimum bending resultant forces acting on the levering in device during momentary overload currents.

Since numerous changes may be made in the above described apparatus, different embodiments of the invention may be made without departing from the spirit and scope thereof. It is, therefore, intended that all the matters contained in the foregoing description and shown in the accompanying drawings shall be interpreted as illustrative and not in a limiting sense.

We claim:

1. Electric switchgear comprising a cell, a circuit breaker unit movable into and out of said cell, said circuit breaker unit comprising an electric circuit breaker, holding means for securing said circuit breaker unit to said cell, levering means for moving said electric circuit breaker between a first disconnected position in said cell and a second connected position in said cell, said levering means comprising a nut rigidly attached to said electric circuit breaker, a threaded shaft passing through said nut and attached to said holding means, retaining means for attaching said threaded shaft to said holding means to permit rotary movement of said threaded shaft while restricting longitudinal movement of said threaded shaft, said nut being in threaded engagement with said rotatable shaft for movement along said shaft as said shaft is rotated whereby said circuit breaker is moved between said first and said second position within said cell as said shaft is rotaed, and wherein said holding means comprising a box beam extending generally across the front of said circuit breaker unit, locking members disposed in proximity to the ends of said box beam and being mounted for movement between a retracted position where said locking members are contained internal of said beam and an engaged position where said locking members lock into said cell and securely connect said box beam to said cell, a flat member, a handle connected to said flat member for simultaneous movement, linking means connecting said locking members to said flat member so that when said handle is rotated said locking members are moved between said retracted position and said engaged position.

2. The switchgear apparatus of claim 1 including a crank for engaging the end of said threaded lead screw retained by said holding means, an opening in said box beam for inserting said crank, an opening in said flat member through which said crank passes to engage said lead screw, said opening in said box beam and said opening in said flat member being in alignment so that said crank may pass therethrough only when said handle is positioned so that said locking members are in the engaged position.

3. Switchgear as claimed in claim 2 where said lead screw member contains a stopping means so that when said lead screw is rotated clockwise to move said electric circuit breaker from said first position to said second position and when said electric circuit breaker is in said second position said nut engages said stop means and further clockwise rotation of said lead screw is not prevented.

4. Electric switchgear as claimed in claim 1 including an interlock for preventing movement of said handle when said electric circuit breaker is moved from said first position in which said electric circuit breaker is flush with said box beam, said interlock comprising a spring loaded pin which engages an opening in said flat member when said electric circuit breaker is spaced from said box beam, and a stud mounted on said electric circuit breaker to disengage said spring bias pin when said electric circuit breaker is flush with said box beam.

5. Electric switchgear as claimed in claim 1 including interlocking means for preventing rotation of said lead screw when said electric circuit breaker is closed and in said second position, said interlock comprising a cup-shaped portion having slots therein rigidly attached to the end of said lead screw, a spring loaded rod to engage the slots in said cup-shaped portion when said circuit breaker is closed and in said second position.

6. Switchgear as claimed in claim 5 wherein said lead screw, said nut stop and said cup-shaped portion are integral.

7. Electric switchgear comprising:
a cell;
a circuit interrupter unit movable into and out of said cell;
said circuit interrupter unit comprising an electric circuit breaker, holding means for securing said circuit interrupter unit to said cell, levering means for moving said electric circuit breaker between a first disconnected position in said cell and a second connected position in said cell;
said levering means comprising a nut attached to said electric circuit breaker, a threaded shaft passing through said nut and attached to said holding means, retaining means for attaching said threaded shaft to said holding means to permit rotary movement of said threaded shaft while restricting longitudinal movement of said threaded shaft with respect to said cell so that said threaded shaft is maintained a fixed distance from the front of said cell; and,
said nut being in threaded engagement with said threaded shaft for movement along said threaded shaft as said threaded shaft is rotated whereby said electric circuit breaker is moved between said first and said second position within said cell as said shaft is rotated.

8. Electric switchgear comprising:
a cell;
a circuit breaker movable into and out of said cell;
a nut secured to said circuit breaker;
an elongated shaft having a threaded portion in engagement with said nut;
a beam attached to the front of said circuit breaker;
locking means connected to said beam to securely fasten said beam to said cell when said circuit breaker is disposed in said cell;
retaining means for connecting said elongated shaft to said beam to permit rotary movement of said shaft while restricting longitudinal movement of said shaft so that when said locking means fasten said beam to said cell and said elongated shaft is rotated said elongated shaft is maintained a fixed distance from the front of said cell while said circuit breaker is moved relative to the front of said cell.

* * * * *